United States Patent
He et al.

(10) Patent No.: US 9,389,097 B2
(45) Date of Patent: Jul. 12, 2016

(54) AIRCRAFT DISPLAY SYSTEMS AND METHODS FOR ENHANCED DISPLAY OF FLIGHT PATH INFORMATION

(75) Inventors: Gang He, Morristown, NJ (US); Thea L. Feyereisen, Hudson, WI (US); Aaron Gannon, Anthem, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2328 days.

(21) Appl. No.: 12/182,904

(22) Filed: Jul. 30, 2008

(65) Prior Publication Data

US 2010/0030405 A1    Feb. 4, 2010

(51) Int. Cl.
    *B64C 13/20*     (2006.01)
    *G05D 1/00*      (2006.01)
    *G01C 23/00*     (2006.01)

(52) U.S. Cl.
    CPC ..................................... *G01C 23/00* (2013.01)

(58) Field of Classification Search
    USPC ........... 701/9, 14, 16, 200, 206; 340/971–980
    See application file for complete search history.

(56) References Cited

U.S. PATENT DOCUMENTS

| | | | | |
|---|---|---|---|---|
| 5,420,582 | A * | 5/1995 | Kubbat | G01C 23/005 340/973 |
| 6,643,580 | B1 | 11/2003 | Naimer et al. | |
| 6,885,313 | B2 | 4/2005 | Selk, II et al. | |
| 7,010,398 | B2 * | 3/2006 | Wilkins, Jr. | G01C 23/005 244/75.1 |
| 7,603,209 | B2 * | 10/2009 | Dwyer | G01C 23/00 340/967 |
| 7,719,483 | B2 * | 5/2010 | Feyereisen | G01C 23/00 340/945 |
| 2003/0132860 | A1 | 7/2003 | Feyereisen et al. | |
| 2004/0225420 | A1 | 11/2004 | Morizet et al. | |

FOREIGN PATENT DOCUMENTS

| | | |
|---|---|---|
| EP | 1462767 A1 | 9/2004 |
| WO | 2006136687 A2 | 12/2006 |

OTHER PUBLICATIONS

Search report issued on Apr. 7, 2010, for European Patent Application No. 09166348.

* cited by examiner

*Primary Examiner* — Adam Tissot
(74) *Attorney, Agent, or Firm* — Ingrassia Fisher & Lorenz, P.C.

(57) ABSTRACT

A display system for a vehicle includes a processing unit configured to receive data representative of flight path information and terrain and to supply display commands associated with the flight path information and the terrain; and a display device coupled the processing unit and configured to receive the display commands and operable to render a three-dimensional view, including symbology representing the flight path information on the terrain.

14 Claims, 3 Drawing Sheets

AIRCRAFT DISPLAY SYSTEMS AND METHODS FOR ENHANCED DISPLAY OF FLIGHT PATH INFORMATION

TECHNICAL FIELD

The present invention generally relates to aircraft display systems and methods and, more particularly, to systems and methods for enhanced display of flight path information.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to flight crews.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Certain types of flight information displayed on Primary Flight Displays, particularly flight path information, are useful in maintaining proper aircraft safety and control. Some previous Primary Flight Displays provided no flight path information other than a conventional flight path marker, while others may provide complicated 3D symbology known as "highway in the sky" or HITS that potentially clutters the airspace area on the display. Additionally, some conventional Primary Flight Displays fail to provide any information about required navigation performance (RNP).

Accordingly, it is desirable to provide systems and methods that increase the visibility and types of certain flight information on a visual display, such as, for example, a Primary Flight Display, similar electronic aircraft displays, and other types of electronic displays. Particularly, it is desirable to provide systems and methods that display improved flight path information and required navigation performance (RNP). Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for a vehicle includes a processing unit configured to receive data representative of flight path information and terrain and to supply display commands associated with the flight path information and the terrain; and a display device coupled the processing unit and configured to receive the display commands and operable to render a three-dimensional view, including symbology representing the flight path information on the terrain.

In accordance with an exemplary embodiment, a display system for a vehicle includes a processing unit configured to receive data representative of required navigation performance information and terrain and to supply display commands associated with the flight path information and the terrain; and a display device coupled the processing unit and configured to receive the display commands and operable to render a three-dimensional view, including symbology representing the required navigation performance information on the terrain.

In accordance with yet another exemplary embodiment, a display system for a vehicle, includes a processing unit configured to receive data representative of flight path information, required navigation performance information, required navigation performance lateral deviation information, and terrain and to supply display commands associated with the flight path information, required navigation performance information, required navigation performance lateral deviation information, and the terrain; and a display device coupled the processing unit and configured to receive the display commands and operable to render a three-dimensional view, including symbology representing the flight path information, required navigation performance information, and required navigation performance lateral deviation information on the terrain.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods display images that include enhanced flight path information and required navigation performance (RNP) information.

Figure 1:
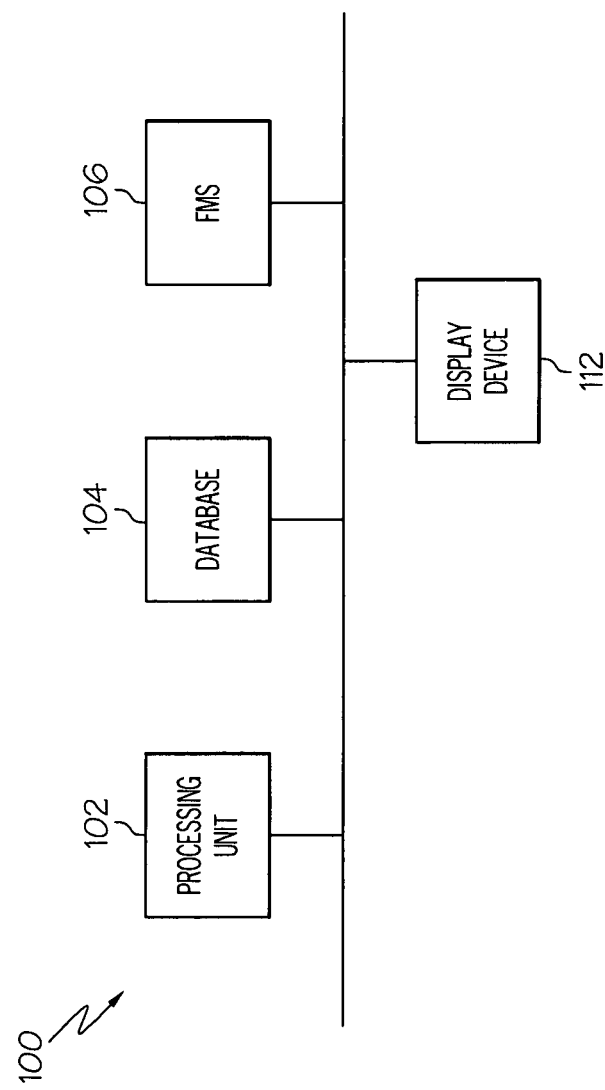
FIG. 1 is a functional block diagram of an aircraft display system according to an exemplary embodiment.

FIG. 1 depicts a block diagram of an exemplary aircraft visual display system 100 for displaying enhanced flight path and required navigation performance (RNP) information. In the exemplary embodiment shown, the system 100 includes a processing unit 102, a database 104, a flight management system 106, and a display device 112. Notably, it should be understood that although the system 100 appears in FIG. 1 to be arranged as an integrated system, the system 100 is not so limited and can also include an arrangement whereby one or more of the processing unit 102, the database 104, the flight management system 106, and the display device 112 is a separate component or a subcomponent of another system located either onboard or external to an aircraft. Also, for example, the system 100 can be arranged as an integrated system (e.g., aircraft display system, Primary Flight Display system, a Head Up Display with SVS or EVS as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a primary flight display (PFD). Generally, the processing unit 102 receives and/or retrieves flight management information (e.g., from the flight management system 106) and landing, target and/or terrain information (e.g., from database 104). The processing unit 102 generates display control signals for a visual display of the flight management information, which includes navigation and control symbology such as a zero pitch reference line, heading indicators, tapes for airspeed and altitude, terrain information, flight path information, RNP information, and any other information desired by a flight crew. The processing unit 102 then sends the generated display control signals to a display device (e.g., the display device 112). More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing, waypoint, and target location as either absolute coordinate data or as a function of an aircraft's position. Database 104 can additionally include other types of navigation information, such as information used to calculate flight path and determine RNP information. Database 104 can also include, for example, a terrain database, which includes the locations and elevations of natural and manmade terrain.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, other important flight information (e.g., pitch, airspeed, altitude, attitude, etc.), and particularly, flight path and RNP information. Information can be provided to the processing unit 102 by, for example, an Inertial Reference System (IRS), Air-data Heading Reference System (AHRS), and/or a global positioning system (GPS).

The system 100 also includes the display device 112 coupled to the processing unit 102. The display device 112 may include any device or apparatus suitable for displaying various types of computer generated symbols and information representing at least pitch, heading, flight path, airspeed, altitude, landing information, waypoints, targets, obstacle, terrain, and RNP data in an integrated, multi-color or monochrome form. Using data retrieved (or received) from the flight management system 106, the processing unit 102 executes one or more algorithms (e.g., implemented in software) for determining the position of the various types of desired information on the display device 112. The processing unit 102 then generates a plurality of display control signals representing this data, and sends display control signals to the display device 112. The display device 112 and/or processing unit 102 may include a graphics display generator for generating the appropriate symbology on the screen of the display device 112, as discussed in greater detail below. In this embodiment, the display device 112 is an aircraft cockpit, multi-color display (e.g., a Primary Flight Display).

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
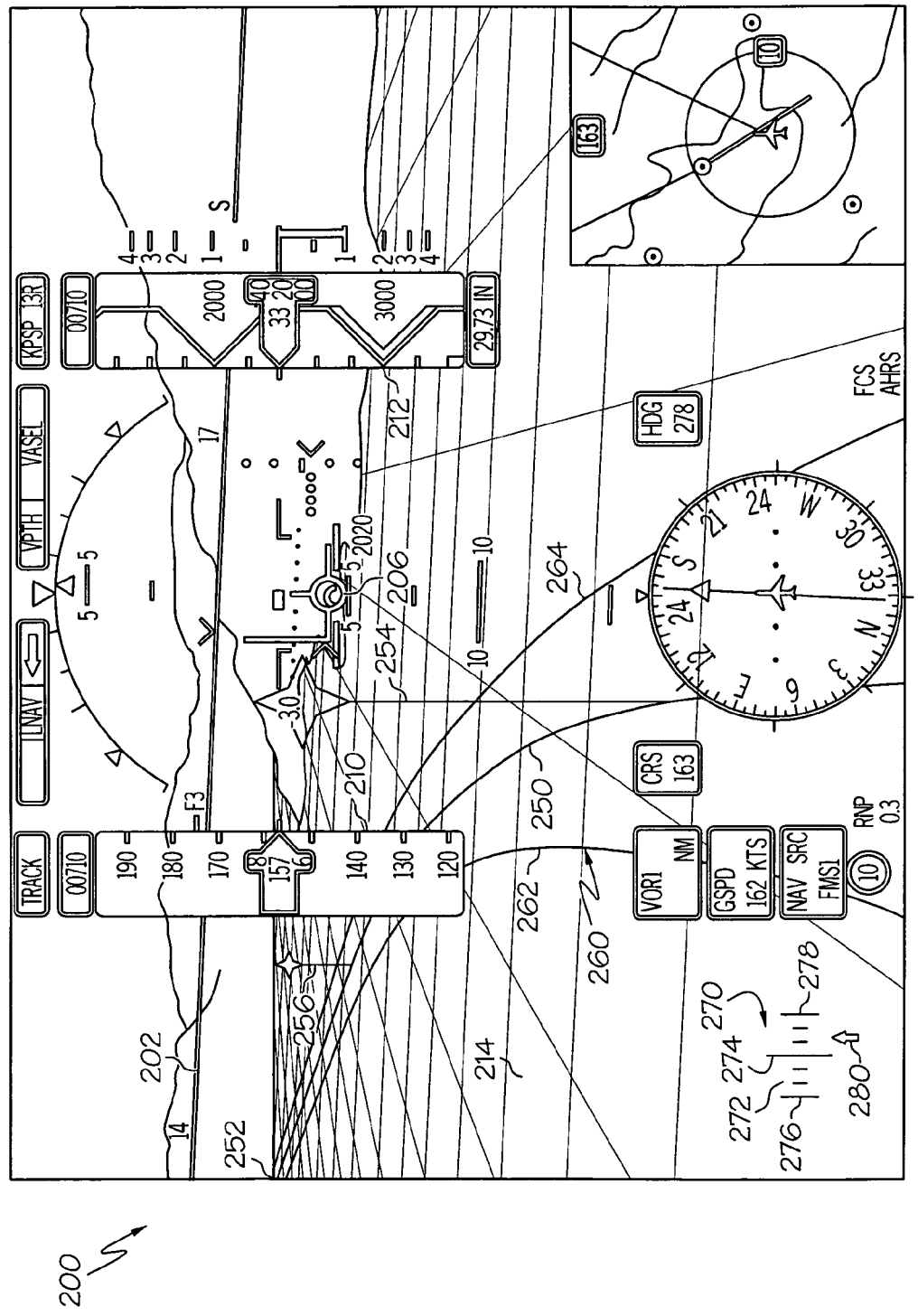
FIG. 2 depicts an exemplary image that may be rendered by the aircraft display system of FIG. 1.
Figure 3:
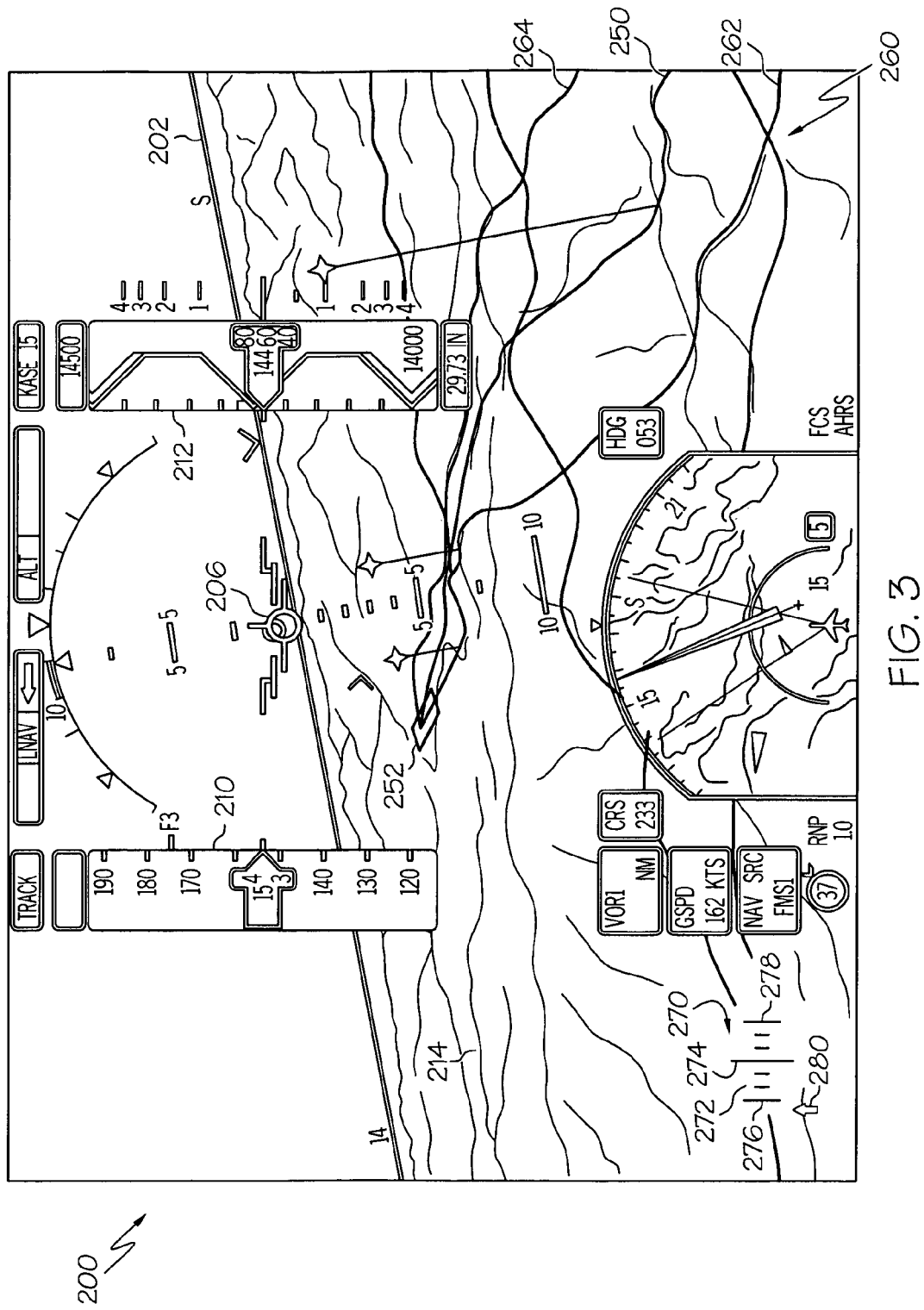
FIG. 3 depicts another exemplary image that may be rendered by the aircraft display system of FIG. 1.

FIGS. 2 and 3 depict examples of an exemplary visual display 200 that may be rendered by the aircraft display system 100 of FIG. 1. The display 200 shows, among other things, computer generated symbols representing a zero pitch reference line (e.g., commonly referred to as a horizon line) 202, a flight path marker (also known as a flight path vector or velocity vector) 206, an airspeed scale or tape 210, an altitude scale or tape 212, and terrain (e.g., identified generally as element 214). In this embodiment, the terrain 214 is rendered as a three-dimensional, perspective view. The terrain 214 can include any representation of the environment surrounding the aircraft, including flattened terrain. Additionally, the terrain 214 can include a virtual plane selected by a pilot at certain elevation relative to the aircraft and is rendered at that elevation. Although the display 200 is shown as an egocentric, first-person frame of reference, the display 200 can be a secondary, wingman, and/or plan or perspective view that enables a viewer to view the aircraft, as well as zoom in and out, including an unmanned vehicle and/or spacecraft. Although the display 200 is generally associated with a Primary Flight Display, the display can also be utilized on a multi-function display, Head Up Display, and/or a head mounted display.

In addition, and as will now be described in more detail, the display 200 in FIGS. 2 and 3 may also selectively render symbology representing flight path information 250 and RNP information 260 that may enhance the situational awareness of the flight crew. Reference is additionally made to FIG. 1 to describe the construction and function of the flight path information 250 and RNP information 260.

Referring initially to FIG. 2, in the depicted embodiment, the flight path information 250 includes a line that traces the intended flight path of the aircraft or any other predetermined route of travel. The term "flight path information" can include any information related to the flight path and/or flight path plan. The calculation of the flight path represented by the flight path information 250 can be based on signals provided by the flight management system 99, as is generally known in the art. As shown in FIG. 2, the flight path information 250 curves around to the left, thereby indicating the specific path of the aircraft to landing area 252. Waypoints, such as waypoints 254, 256, may also be shown along the line of the flight path information 250. The waypoints 254, 256 can be 2D or 3D waypoints. Although the flight path information 250 is rendered as a line, any suitable depiction can be provided, such as for example, dashes or arrows. Additionally, different segments of flight path may be rendered with different color, appearance, attributes to represent different leg of a flight path. For example, an origin segment, approach segment, missed approach segment, etc. may each have different colors or attributes to distinguish the respective leg.

The flight path information 250 is conformally traced along the terrain 214 to provide a more convenient and intuitive location. Additionally, the flight path information 250 on the terrain 214 may increase situational awareness for the flight crew as the flight path information 250 traces the flight path around potential obstacles. In contrast to some conventional displays, the flight path information 250 does not increase the amount of information in the airspace portion of the display 200. Typically, the flight path information 250 is displayed at all times during flight. However, in other embodiments, the flight path information 250 can be selectively displayed, for example, as desired by the flight and/or as a function of conditions. For example, the flight path information 250 can appear when the direction of the flight path changes, when the aircraft is significantly off of the intended flight plan, during approach, and/or at low altitudes. Additionally, missed approach legs of the flight path information 250 of the flight path may be triggered by system-go-around commands or pilot input.

As noted above, the display 200 further may include RNP information 260 that represents a navigation performance necessary for operation within a given airspace, as specified by the Federal Aviation Administration (FAA) or other governing body. RNP is a tool for the development of more efficient airspace and operations. RNP, and correspondingly the RNP information 260, may vary based airspace, mode of flight, route, and/or procedure. Essentially, the RNP represents the area in which the aircraft is required to operate, and functions as a safety corridor for the aircraft on either side of the flight path. As an example, the RNP standard may require a precise and tight area of operation during approach and landing, while the area may be wider during the en route phase of the flight.

Accordingly, in the depicted embodiment, the RNP information 260 includes lines 262, 264 on either side of the flight path information 250. Line 262 is the left side boundary of the RNP, and line 264 is the right side boundary of the RNP. These lines 262, 264 on the terrain 214 correspond to the position of actual RNP boundaries relative to the physical terrain. As the RNP standards change, the RNP information 260 will correspondingly change, for example, generally by widening or narrowing the lines 262, 264. Like the flight path information 250, the RNP information 260 is conformally traced on the terrain 214. The RNP information 260 provides enhanced situational awareness for the flight crew to easily access whether the aircraft is conforming to RNP standards. Generally, the RNP information 260 will be displayed at all times during flight. However, in an alternate embodiment, the RNP information 260 will be selectively displayed as desired by the flight crew, as a function of phase of flight, and/or as a function of position. For example, the RNP information 260 can be displayed upon approach, during a change in RNP, when the aircraft position approaches one of the RNP boundaries, and/or when the aircraft is operating outside of the RNP boundaries.

As also shown in the exemplary display 200 of FIG. 2, RNP lateral deviation 270 can also be provided. The RNP lateral deviation 270 is a convenient depiction of the position of the aircraft relative to the RNP boundaries. Generally, the RNP lateral deviation 270 includes a scale 272 with a center 274. The left side mark 276 of the scale 272 corresponds to the left side boundary of the RNP standard (also represented on the terrain 214 as line 262), and the right side mark 278 of the scale 272 corresponds to the right side boundary of the RNP standard (also represented on the terrain 214 as line 264). An arrow 280 indicates the position of the aircraft relative to the left and right sides marks 276, 278, and thus, indicates the position of the aircraft relative to the RNP standard. The arrow 280 moves to the right or left with lateral deviation displacement. The scaling of the scale 272 may be dependent, for example, on the segment or phase of flight and/or the RNP for the particular segment.

As noted above, FIG. 3 depicts another example of the display 200 provided by the system 100 of FIG. 1. Like FIG. 2, the display 200 in FIG. 3 includes flight path information 250 and RNP information 260 that is conformally traced on the terrain 214, as well as RNP lateral deviation 270. However, in the situation depicted by FIG. 3, the aircraft is outside of the lines 262, 264 of the RNP information 260. In particular, the aircraft is positioned to the left of left side line 262, which indicates that the aircraft is operating outside of the RNP standard. In these situations, the system 100 can issue a warning to the flight crew. In one example, the color of the RNP information 260 and/or RNP lateral deviation 270 can be changed, for example, from green to yellow. In another example, the RNP information 260 and/or RNP lateral deviation 270 can blink or otherwise be emphasized. The warning level can also be a function of duration. For example, if the aircraft stays outside of the lines 262, 264 for a predetermined amount of time, the system 100 can elevate the warning. The elevated warning can include, for example, a dedicated warning annunciation, more urgent colors or blinking, an auditory warning, and/or a tactile warning such as seat shaking, stick shaking, and/or a tactile vest. The system 100 may also issue a warning if a current projected path and/or motion dynamics of the aircraft may result in the aircraft exceeding the RNP boundaries. This enables the flight crew to take corrective action prior to the aircraft flying outside of the RNP boundaries, e.g., represented by the aircraft flying outside of lines 262, 264.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
a processing unit configured to receive data representative of flight path information and terrain and to supply display commands associated with the flight path information and the terrain; and
a display device coupled the processing unit and configured to receive the display commands and operable to render a three-dimensional view, including symbology representing the flight path information on the terrain, wherein the flight path information is conformal to the terrain, wherein the processing unit is further configured to receive data representative of required navigation performance information and to supply display commands associated with the required navigation performance information, and wherein the display device is further configured to render the required navigation performance information, and wherein the required navigation performance information includes first and second boundary lines, and wherein the processing unit is further configured to issue a warning if the vehicle is operating in a position outside of the first and second boundary lines.

2. The display system of claim 1, wherein the flight path information includes a line that traces a flight path to a destination.

3. The display system of claim 1, wherein the flight path information is selectively rendered based on at least one of pilot input, mode of flight, and system go around commands.

4. The display system of claim 1, wherein the flight path information includes at least two segments rendered in different colors.

5. The display system of claim 1, wherein the first boundary line is on a first side of the flight path information and the second boundary line is on a second side of the flight path information.

6. The display system of claim 1, wherein the first and second boundary lines are modified upon a change in the required navigation performance information.

7. The display system of claim 1, wherein the warning includes a change in color of the boundary lines.

8. The display system of claim 1, wherein the flight path information further includes waypoints.

9. The display system of claim 1, wherein the processing unit is further configured to receive data representative of required navigation performance lateral deviation and to supply display commands associated with the required navigation performance lateral deviation, and wherein the display device is further configured to render the required navigation performance lateral deviation.

10. A display system for a vehicle, comprising:
a processing unit configured to receive data representative of flight path information and terrain and to supply display commands associated with the flight path information and the terrain; and
a display device coupled the processing unit and configured to receive the display commands and operable to render a three-dimensional view, including symbology representing the flight path information on the terrain, wherein the flight path information is conformal to the terrain, wherein the processing unit is further configured to receive data representative of required navigation performance information and to supply display commands associated with the required navigation performance information, and wherein the display device is further configured to render the required navigation performance information, and wherein the required navigation performance information includes first and second boundary lines,
wherein the processing unit is further configured to receive data representative of required navigation performance lateral deviation and to supply display commands associated with the required navigation performance lateral deviation, and wherein the display device is further configured to render the required navigation performance lateral deviation, and
wherein the required navigation performance lateral deviation includes a scale and an arrow positioned relative to the scale to indicate a position of the aircraft relative to the required navigation performance.

11. A display system for a vehicle, comprising:
a processing unit configured to receive data representative of required navigation performance information and terrain and to supply display commands associated with the flight path information and the terrain; and
a display device coupled the processing unit and configured to receive the display commands and operable to render a three-dimensional view, including symbology representing the required navigation performance information on the terrain,
wherein the required navigation performance information includes lines that conformally trace a required navigation performance standard.

12. The display system of claim 11, wherein the lines are modified upon a change in the required navigation performance information.

13. The display system of claim 11, wherein the processing unit is further configured to issue a warning if the vehicle is operating in a position outside of the lines, or a current projected path or motion dynamics of the aircraft indicates that the vehicle will operate outside the lines.

14. The display system of claim 11, wherein the processing unit is further configured to issue a warning if the vehicle is operating in a position outside of the first and second boundary lines for a predetermined amount of time.

* * * * *